(12) United States Patent
Selesnick et al.

(10) Patent No.: US 8,830,120 B2
(45) Date of Patent: Sep. 9, 2014

(54) PRESCRIBED MODULUS CHIRP-LIKE WAVEFORMS WITH MULTIPLE FREQUENCY NOTCHES

(75) Inventors: Ivan William Selesnick, Maplewood, NJ (US); Unnikrishna Sreedharan Pillai, Harrington Park, NJ (US)

(73) Assignee: C&P Technologies, Inc., Closter, NJ (US)

( * ) Notice: Subject to any disclaimer, the term of this patent is extended or adjusted under 35 U.S.C. 154(b) by 525 days.

(21) Appl. No.: 13/307,468

(22) Filed: Nov. 30, 2011

(65) Prior Publication Data

US 2013/0135141 A1      May 30, 2013

(51) Int. Cl.
G01S 7/282       (2006.01)
G01S 7/288       (2006.01)
G01S 13/28       (2006.01)

(52) U.S. Cl.
CPC ............... G01S 7/282 (2013.01); G01S 7/288 (2013.01); G01S 13/282 (2013.01)
USPC ............ 342/202; 342/82; 342/201; 342/204

(58) Field of Classification Search
CPC ........ G01S 13/282; G01S 7/282; G01S 7/288
USPC ............................. 342/82, 175, 201, 202, 204
See application file for complete search history.

(56) References Cited

U.S. PATENT DOCUMENTS

| | | | | |
|---|---|---|---|---|
| 5,337,056 A | * | 8/1994 | Dax | 342/128 |
| 5,612,978 A | * | 3/1997 | Blanchard et al. | 375/350 |
| 5,852,418 A | * | 12/1998 | Ferrell et al. | 342/202 |
| 6,091,356 A | * | 7/2000 | Sanders et al. | 342/132 |
| 8,259,779 B2 | * | 9/2012 | Blanchard et al. | 375/146 |
| 2004/0264561 A1 | * | 12/2004 | Alexander et al. | 375/232 |
| 2008/0317150 A1 | * | 12/2008 | Alexander et al. | 375/260 |

OTHER PUBLICATIONS

Selesnick, I.W.; Unnikrishna Pillai, S.; Richeng Zheng; , "An iterative algorithm for the construction of notched chirp signals," Radar Conference, 2010 IEEE, vol., No., pp. 200-203, May 10-14, 2010doi: 10.1109/RADAR.2010.5494625.
Selesnick, I.W.; Pillai, S.U.; , "Chirp-like transmit waveforms with multiple frequency-notches," Radar Conference (RADAR), 2011 IEEE , vol., No., pp. 1106-1110, May 23-27, 2011 doi: 10.1109/RADAR.2011.5960706.

* cited by examiner

*Primary Examiner* — John B Sotomayor
*Assistant Examiner* — Marcus Windrich
(74) *Attorney, Agent, or Firm* — Walter J. Tencza, Jr.

(57) ABSTRACT

An iterative method for modifying an initial time signal to form a created signal having a prescribed envelope, and frequency notches at prescribed frequency values, wherein the created signal closely resembles the initial time signal, the envelope of the created time signal is the prescribed envelope, and the Fourier magnitude of the created time signal at the prescribed frequency values is nearly zero. The created time signal may be a real-valued signal as well as a complex-valued time signal which closely resembles an arbitrary initial time signal, including initial time signals which are standard transmit signals for radar systems, and which have Fourier transform magnitudes with notches and stop-bands at prescribed frequency values. These notches and stop bands are created by enforcing nulls of prescribed order at the prescribed frequency values within the modified time signal.

30 Claims, 13 Drawing Sheets

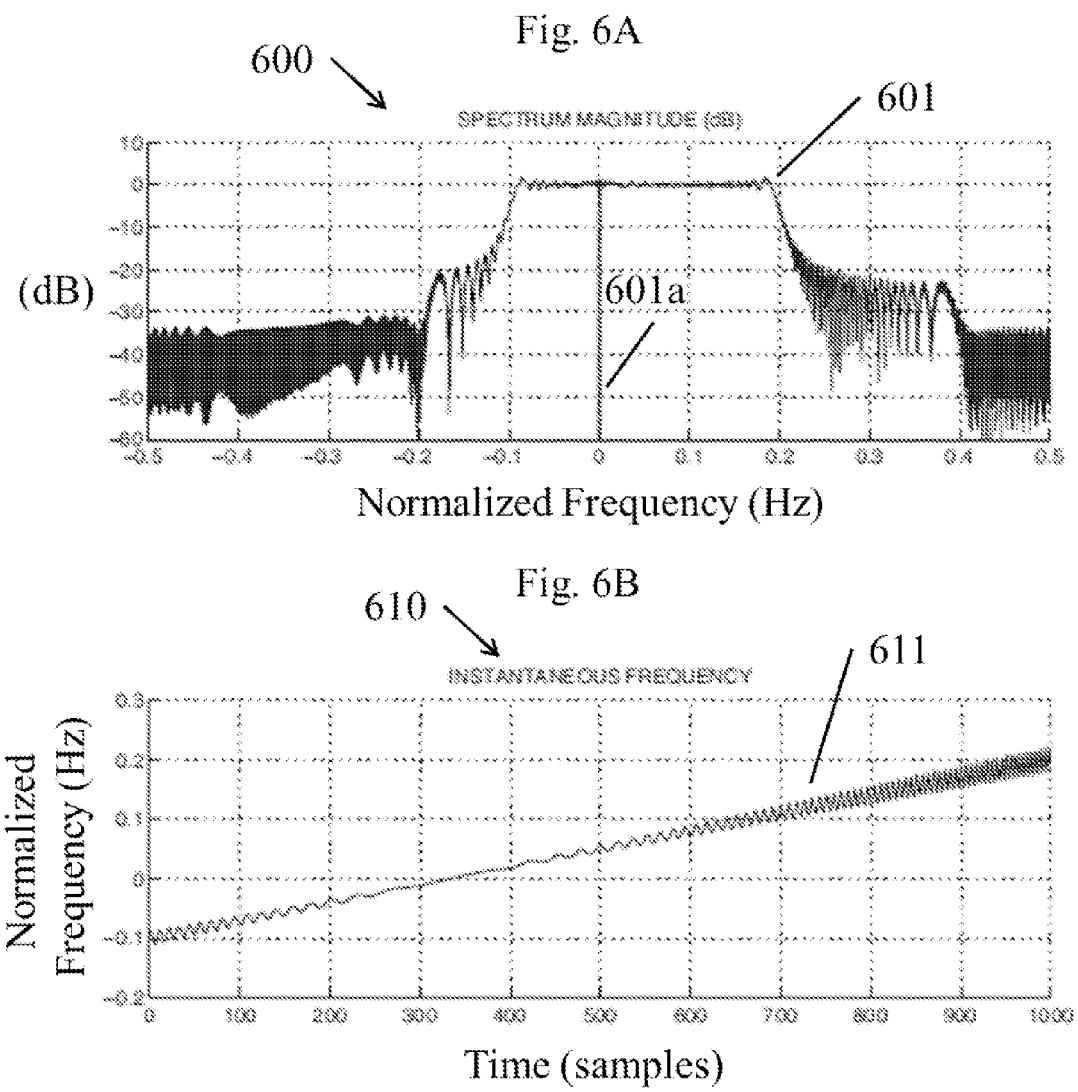

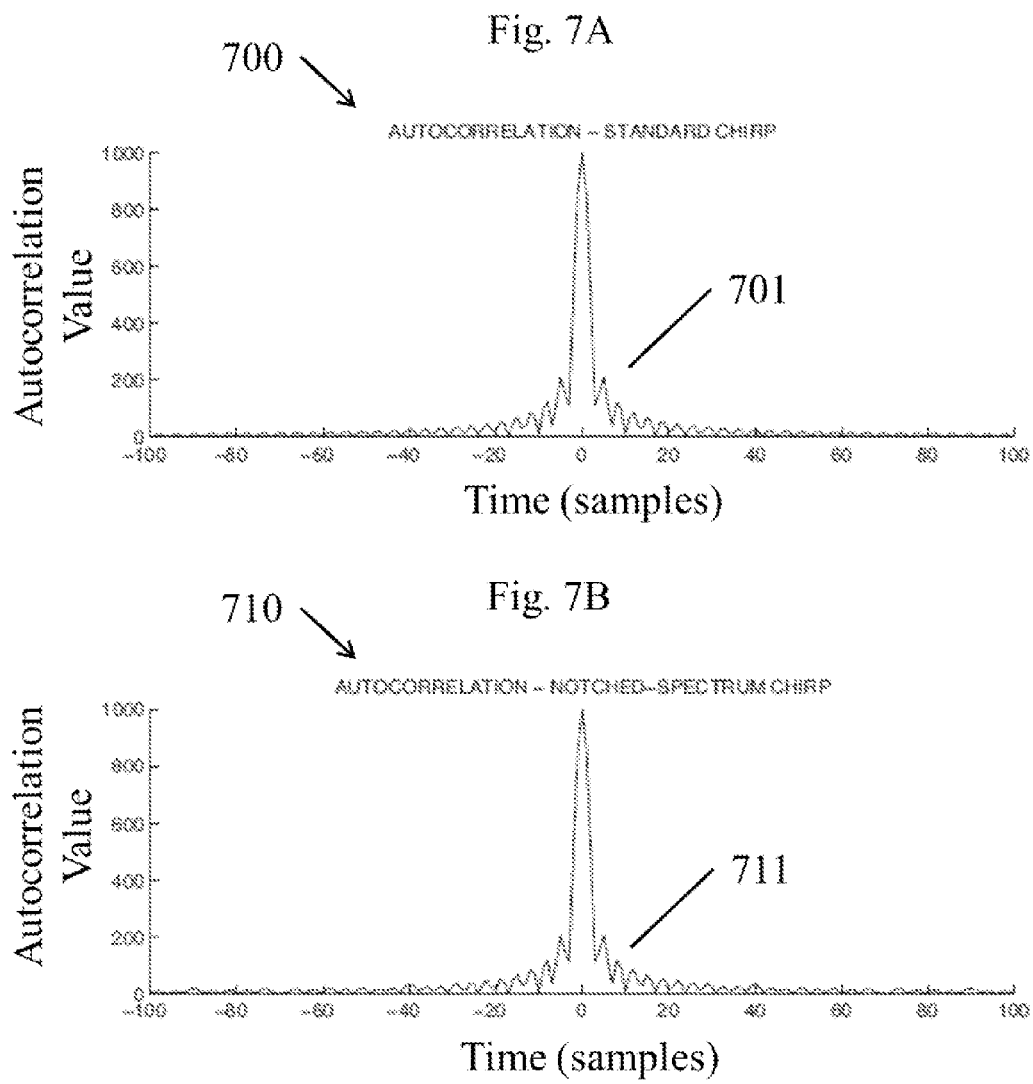

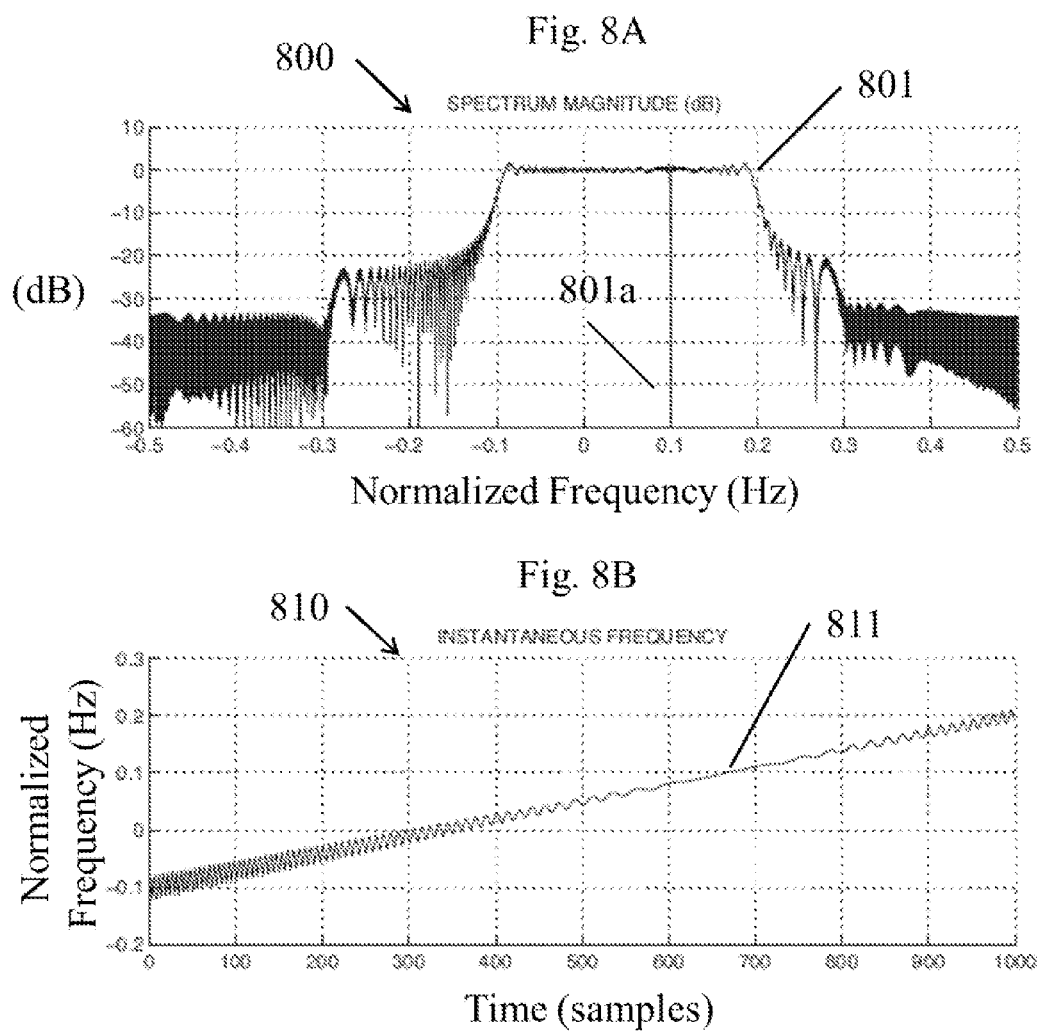

PRESCRIBED MODULUS CHIRP-LIKE WAVEFORMS WITH MULTIPLE FREQUENCY NOTCHES

STATEMENT FEDERALLY SPONSORED RESEARCH OR DEVELOPMENT

The present invention is based upon work supported and/or sponsored by the Information Innovation Office, Defense Advanced Research Project Agency (DARPA), Arlington, Va., under SBIR Phase II contract No. D11 PC20007.

FIELD OF THE INVENTION

The present invention relates to radar systems, and to methods and apparatus for transmitting signals in radar systems.

BACKGROUND OF THE INVENTION

In radar systems, an electromagnetic signal typically having a pulsed waveform is transmitted from a radar antenna, reflected from a target or targets, and received at a radar receiver. The range resolution of the radar system improves with increasing bandwidth of the electromagnetic signal transmitted by the radar. Because typical radar systems may operate at frequencies which include reserved or restricted frequency bands, high-bandwidth electromagnetic signal transmittal may interfere with communications, navigation, or other uses of these frequency bands. In particular, if other systems operate in relatively narrow frequency bands, the wide-band spectrum of the transmitted electromagnetic signal waveform should have notches or stop-bands at the respective frequency bands, with widths in proportion to the bandwidths of the respective frequency bands.

Additional desirable properties for waveforms of high-bandwidth transmit electromagnetic signals include a constant or near-constant modulus, to accommodate physical constraints in peak power for radar transmitters; and good pulse compression properties, for target discrimination. For example, due to its performance under each of these criteria, the 'chirp' or linear frequency modulated (LFM) electromagnetic signal is widely used in known radar systems. However, because of its near-constant power spectral density over its bandwidth, the chirp electromagnetic signal may cause interference with other systems that are in the radar's operational range and operating at frequency bands within the radar's transmit signal waveform bandwidth. Thus, various methods have been developed for modifying the waveform of the electromagnetic transmit signal to have minimal power spectral density over these frequency bands.

SUMMARY OF THE INVENTION

One or more embodiments of the present invention transmit an electromagnetic signal having a wide bandwidth constant-modulus waveform with multiple frequency notches or stop-bands.

One or more embodiments of the present invention provide an iterative method for constructing an electromagnetic signal having a constant-modulus, finite-duration waveform with a variable number of notches and stop-bands at user-specified frequencies within its spectrum. A method of one or more embodiments of the present invention may be used to modify any initial electromagnetic signal having any initial waveform, such as a swept-frequency chirp-like waveform, to form a modified electromagnetic signal having a modified waveform and the modified waveform may have an arbitrary pulse envelope shape, including a constant modulus envelope.

One or more embodiments of the present invention differ from prior methods for generating electromagnetic signals having a high-bandwidth waveform with specified notches in that prior methods are non-iterative. The iterative nature of one or more embodiments of the present invention means that frequency nulls may be achieved with arbitrary accuracy, meaning deeper and narrower frequency notches may be achieved than with prior methods. Unlike prior methods, one or more embodiments of the present invention are valid for wide stop-bands in short-duration pulses. One or more embodiments of the present invention may be used to create frequency nulls of arbitrary order at arbitrary frequencies. Thus, wide frequency stop-bands may be synthesized using higher-order or closely-spaced frequency nulls, allowing flexibility for one or more embodiments of the present invention in the Fourier magnitude of a constructed electromagnetic transmit signal.

In at least one embodiment of the present invention a method is provided comprising storing in a computer memory a first waveform for a zeroth iteration; receiving in a computer memory a plurality of frequency values; receiving in a computer memory a plurality of notch depths, such that each of the plurality of frequency values has a corresponding notch depth of the plurality of notch depths; and receiving in a computer memory a pulse envelope function. The method may be further comprised of repeating the following steps for one or more iterations, starting with the zeroth iteration, such that k=0 for the zeroth iteration: (a) modifying the first waveform for the kth iteration to create a second waveform for the kth iteration in computer memory, such that a Fourier transform of the second waveform for the kth iteration is equal to zero at each of the plurality of frequency values; (b) modifying the second waveform for the kth iteration to form a third waveform for the kth iteration in computer memory, such that the pulse envelope function of the third waveform for the kth iteration is equal to the pulse envelope function of the first waveform for the kth iteration; (c) if a stopping condition has not been met, storing the third waveform for the kth iteration as a first waveform for the (k+1)th iteration in computer memory, thereafter with k incremented by one, starting a kth iteration of the one or more iterations, and otherwise if the stopping condition has been met, stopping the one or more iterations, wherein the stopping condition is defined by a set of criteria stored in computer memory.

The first waveform for the zeroth iteration may be a swept-frequency chirp waveform of a specific bandwidth and duration. The pulse envelope function may be a constant modulus function.

In at least one embodiment, after the stopping condition has been met, the third waveform for the kth iteration has a plurality of stop bands, wherein each of the plurality of stop bands of the third waveform for the kth iteration has a spectrum magnitude which is approximately zero.

In at least one embodiment, after the stopping condition has been met, the third waveform for the kth iteration includes a first notch at a first frequency value, wherein the first notch has a Fourier transform value at the first frequency value which is approximately zero, wherein the first notch is based on an order derivative of a Fourier transform, wherein the order derivative of the Fourier transform is greater than or equal to a first order derivative.

In at least one embodiment the first waveform of the zeroth iteration, called $y_0$, is a chirp waveform and is determined by a computer processor from the following equation:

$$y_0 = \exp(j(2\pi f_0 t + \beta t^2)), 0 \le t \le T$$

wherein $f_0$ is a carrier frequency of the first waveform), $\beta$ is a parameter describing a bandwidth of the first waveform of the zeroth iteration, and T is a duration of the first waveform of the zeroth iteration $y_0(n)$, In at least one embodiment, the first waveform for the kth iteration, which is called $y_k(t)$, is modified to form the second waveform for the kth iteration, which is called $z_k(t)$ by a computer processor using the following equation:

$$z_k(t) = y_k(t) K \exp(j2\pi f_1 t), 0 \le t \le T;$$

Wherein t is a continous time index; wherein $$K = \frac{1}{T} \int_0^T y_k(\tau) \exp(-j2\pi f_1 \tau) d\tau;$$

T is a duration of the first waveform for the kth iteration, $y_k(t)$; and f is a specified null frequency, creating a single null at frequency $f_1$.

In at least one embodiment, the first waveform for the kth iteration, which is called $y_k(n)$, is modified to form the second waveform for the kth iteration, which is called $z_k(n)$ by a computer processor using the following equation:

$$z_k(n) = y_k(n) - K \exp(j2\pi f_1 n), 0 \le n \le N-1$$

wherein n is a discrete time index; wherein $$K = \frac{1}{N} \sum_{n=0}^{N-1} y_k(n) \exp(-j2\pi f_1 n);$$

N is a number of points of the first waveform for the kth iteration, $y_k(n)$; and f is a specified null frequency, creating a single null at frequency $f_1$.

In at least one embodiment, the second waveform for the kth iteration, named $z_k(t)$ is modified to form the third waveform for the kth iteration, named $\tilde{y}_{k(t)}$ by the following equation:

$$\tilde{y}_k(t) \leftarrow \exp(j \lessdot z_k(t)), 0 \le t \le T,$$

wherein T is the duration of the first waveform for the zeroth iteration $y_0(t)$, $\lessdot(\bullet)$ denotes the angle operation arctan $(\text{Im}(\bullet)/\text{Re}(\bullet))$.

In at least one embodiment the stopping condition is that a total mean squared error between the third waveform for the kth iteration $\tilde{y}_{k(t)}$ and the first waveform for the kth iteration $y_k(t)$ which is computed as $\|\tilde{y}_k(t) - y_k(t)\|$ by a computer processor, is less than a threshold stored in computer memory.

In another embodiment, the first waveform of the zeroth iteration is chirp waveform specified as $y_0(n)$ and is determined by a computer processor using the following equation:

$$y_0(n) = A(n) \exp(j(2\pi f_0 n + \beta n^2)), 0 \le n \le N-1 \quad (1)$$

wherein, A(n) is a pulse envelope function, $f_0$ is a carrier frequency for the first waveform for the kth iteration, $\beta$ is a parameter describing the bandwidth of the waveform, and N is a number of samples in the first waveform of the zeroth iteration.

In another embodiment, the first waveform for the kth iteration, which is called $y_k$ is modified to form the second waveform for the kth iteration, which is called $z_k$, by using a computer processor to determine the following equation:

$$z_k \leftarrow y_k - QQ^H y_k$$

wherein Q is a matrix which is an orthogonalization of a matrix C whose columns consist of a plurality of vectors each of which is either a discrete Fourier transform vector or a derivative vector of a order derivative greater than or equal to a first order derivative, associated with the plurality of frequency values, given by $$C = [c_1, c_2, \ldots, c_R],$$

wherein $c_1, c_2, \ldots, c_R$ specify a plurality of column vectors, such that the matrix C has r column vectors, and each column vector of the plurality of column vectors has the form $$c_m = [0, (-j2\pi)^{l-1} e^{-j2\pi jm}, \ldots, (-j2\pi i)^{l-1} e^{-j2\pi i f_m}, \ldots, (-j2\pi(N-1))^{l-1} e^{j2\pi(N-1)f_m}]$$

wherein m is an index indicating a particular column vector of the matrix C; and wherein l is a an integer used to indicate a derivative of an order greater than or equal to a first order derivative, such that l is greater or equal to one and $Q^H$ is a matrix which is the Hermitian conjugate of Q.

In another embodiment, the second waveform for the kth iteration, named $z_k(n)$ is modified to form the third waveform for the kth iteration, named $\tilde{y}_k(n)$ by using a computer processor to force the third waveform for the kth iteration to have pulse envelope function A(n) by the operation $\tilde{y}_k(n) \leftarrow A(n) \exp(j \lessdot z_k(n))$, $0 \le n \le N-1$, where $\lessdot(\bullet)$ denotes the angle operation arctan $(\text{Im}(\bullet)/\text{Re}(\bullet))$.

In another embodiment, the stopping condition is that a total mean squared error between the third waveform for the kth iteration $\tilde{y}_k(n)$ and the first waveform for the kth iteration $y_k(n)$, computed by a computer processor as $\|\tilde{y}_k(n) - y_k(n)\|_2$, is less than a threshold stored in computer memory.

BRIEF DESCRIPTION OF THE DRAWINGS

FIG. 6A shows a graph of a spectrum magnitude of a modified electromagnetic signal having a modified waveform, created by a method of an embodiment of the present invention, by modifying the electromagnetic signal having the waveform shown in FIG. 1A to include a created null at frequency $f_1 = 0$ Hz;

FIG. 6B shows an instantaneous frequency of an electromagnetic signal having a waveform shown in FIG. 5A, over one thousand sample duration;

FIG. 7A shows an autocorrelation function of an electromagnetic signal having the waveform in FIG. 1A, for time lag from "−100" to "100" samples;

FIG. 7B shows an autocorrelation function of an electromagnetic signal having the waveform in FIG. 6A, for time lag from "−100" to "100" samples;

FIG. 8A shows a spectrum magnitude of an electromagnetic signal created by an embodiment of the present invention, modifying the electromagnetic signal having the waveform shown in FIG. 1a to include a created null at frequency $f_1$=0.1 Hz;

FIG. 8B shows the instantaneous frequency of an electromagnetic signal having the waveform in FIG. 8A, over a one thousand-sample duration;

DETAILED DESCRIPTION OF THE DRAWINGS

Figure 13:
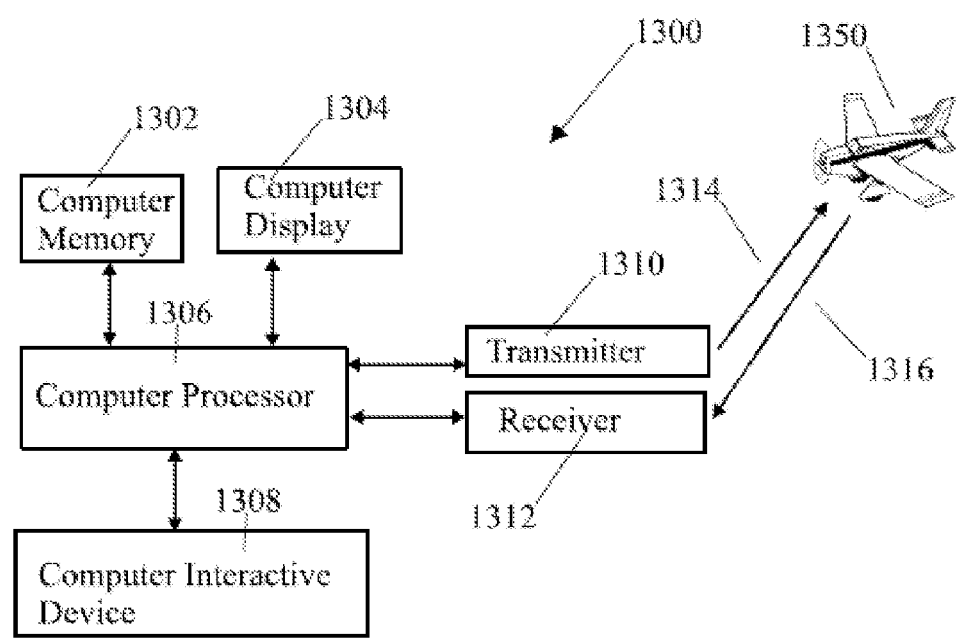
FIG. 13 shows an apparatus in accordance with an embodiment of the present invention along with a target.

FIG. 13 shows an apparatus 1300 in accordance with an embodiment of the present invention along with a target 1350. The apparatus 130 may include a computer memory 1302, a computer display 1304, a computer processor 1306, a computer interactive device 1308, a transmitter 1310, and a receiver 1312. The computer memory 1302, the computer display 1304, the computer interactive device 1308, the transmitter, and the receiver 1312 may communicate with the computer processor 1306 such as through electrical communications lines, wireless communications, other any other communications. The computer processor 1306 may be programmed by a computer program stored in computer memory 1302 to cause the transmitter 1310 to transmit a signal towards the target 1350 through the airwaves 1314, and to receive a signal reflected from the target 1350 via the airwaves 1316.

Figure 1A:
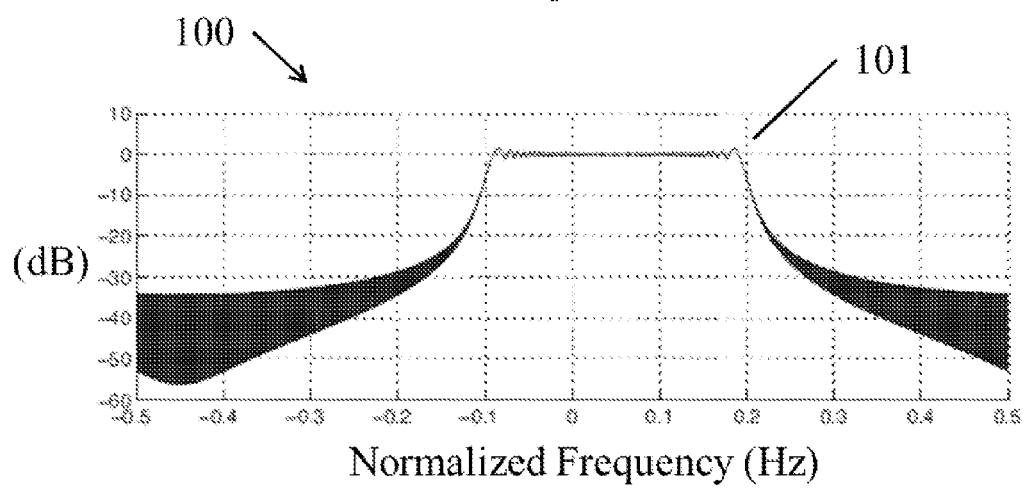
FIG. 1A shows a diagram of the spectrum magnitude of an electromagnetic signal having a standard chirp waveform with frequency swept over the interval −0.1 Hz to 0.2 Hz.

FIG. 1A shows a diagram 100. The diagram 100 includes an x axis labeled "Normalized Frequency (Hz)", and a y axis labeled "(dB)". The diagram 100 includes a curve 101 which represents the spectrum magnitude $|Y(f)|=|\Sigma_{n=0}^{N-1}y(n)\exp(-j2\pi fn)|$ of a standard chirp electromagnetic signal waveform with frequency swept from −0.1 Hz to 0.2 Hz. The chirp waveform may be represented by $y(n)=A(n)\exp(j(2\pi f_0 n+\beta n^2))$, where $A(n)$ is a pulse envelope function, and here $f_0$=−0.1 Hz, $\beta$=9.42 $10^{-4}_x$, and n=1→1000.

Figure 1B:
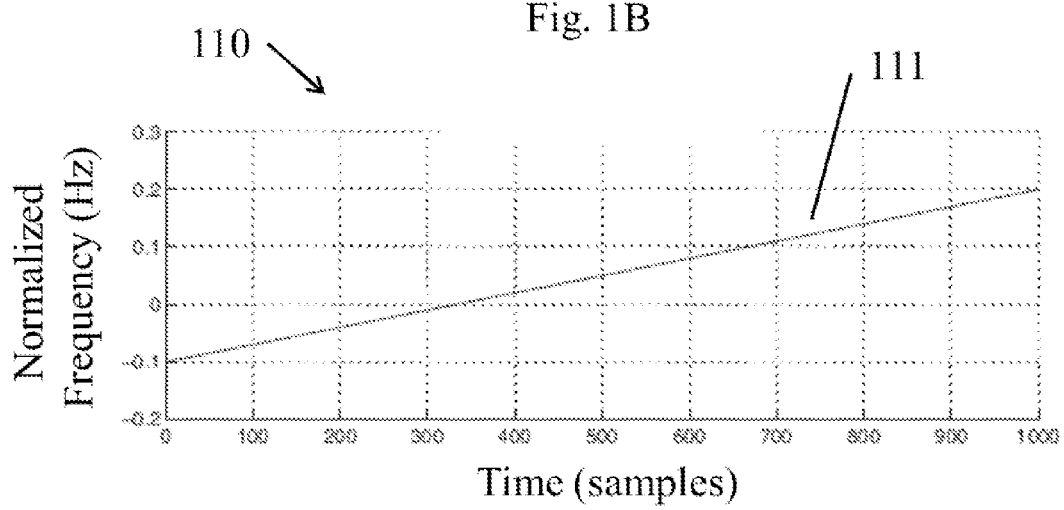
FIG. 1B shows a diagram of the instantaneous frequency of an electromagnetic signal having a standard chirp waveform in FIG. 1A, over a one thousand-sample duration.

FIG. 1B shows a diagram 110. The diagram 110 includes an x axis labeled "Time (samples)", and a y axis labeled "Normalized Frequency (Hz)". The diagram 100 includes a curve 111 which represents the instantaneous frequency of the chirp waveform in FIG. 1A. The chirp waveform exhibits a linearly sweeping frequency over the duration of the pulse.

Figure 2:
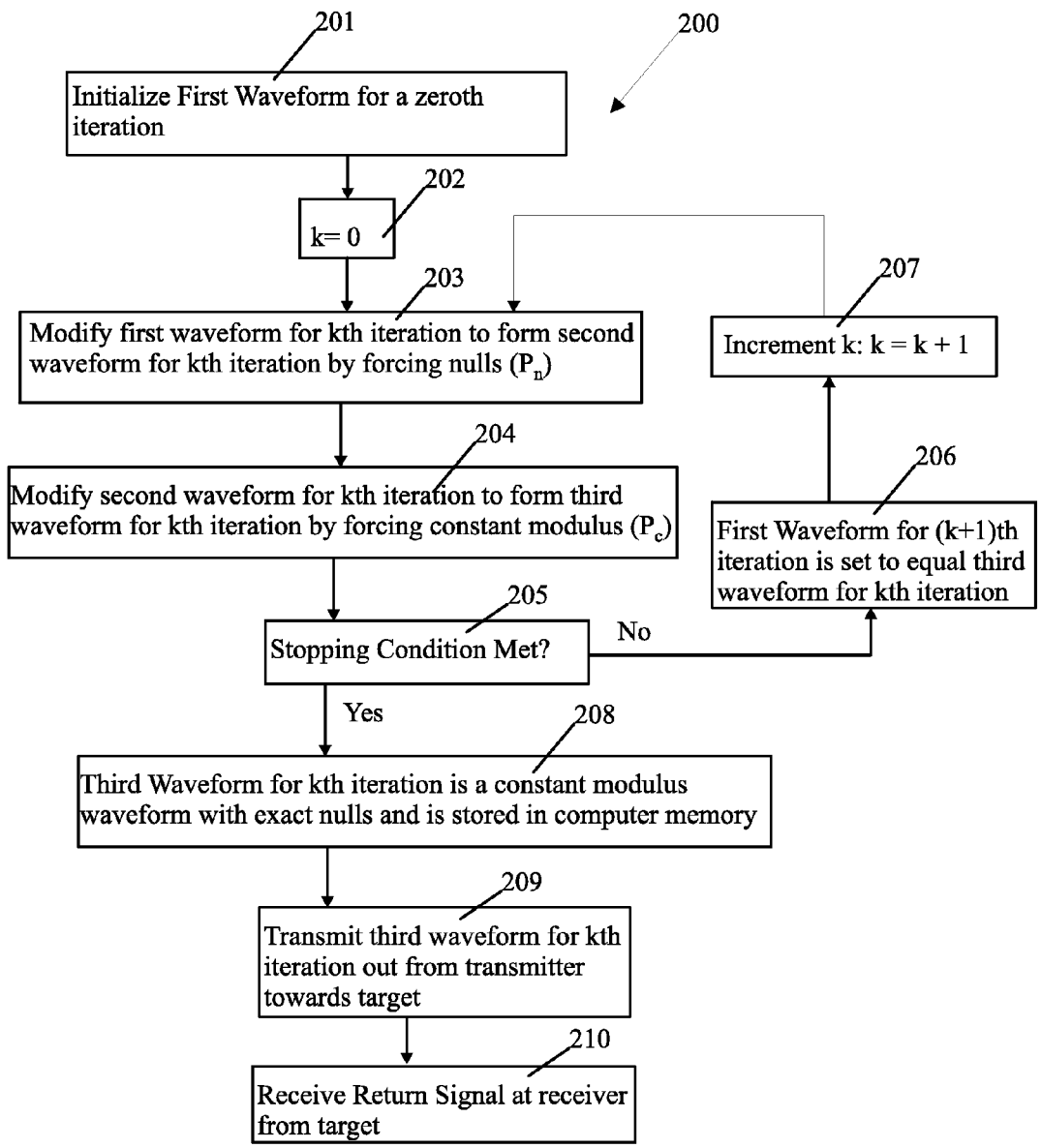
FIG. 2 shows a diagram of a flow chart in accordance with a method of an embodiment of the present invention.

FIG. 2 shows a flow chart 200, depicting a method of an embodiment of the present invention. At step 201, a first waveform for a zeroth iteration (for k=0, may also be called a first iteration for a first pass through a loop) is initialized by a computer processor, such as computer processor 1306 shown in FIG. 13. The first waveform may be initialized by the computer processor 1306 by storing characteristics of the first wave form in a computer memory, such as computer memory 1302 in FIG. 13, which may include a vector of data values representing a digitally sampled time series. This first waveform may be a high-bandwidth swept frequency signal, such as a chirp signal. At step 202 an index k, may be initialized to 0 in computer memory 1302 for a zeroth iteration (for k=0 or first iteration for first pass through loop)_by the computer processor 1306.

At step 203, the first waveform for the kth iteration is modified into a second waveform for the kth iteration by setting a plurality of values at a first plurality of frequency values to zero in computer memory 1302 by the computer processor 1306. At step 204, the second waveform for the kth iteration is modified into a third waveform for the kth iteration by forcing the third waveform for the kth iteration to have constant modulus, meaning the magnitude of the third waveform for the kth iteration which is a complex-valued signal must be constant over its duration. The third waveform or characteristics of the third waveform for the kth iteration are stored in computer memory 1302 by the computer processor 1306.

At step 205, the computer processor 1306 tests a stopping condition stored in computer memory 1302. If the stopping condition is not met, step 206 is next executed by the computer processor 1306. At step 206 a first waveform for the (k+1)th iteration is set equal to the third waveform for the kth iteration in computer memory 1302 by the computer processor 1306. At step 207, k is incremented so, if k was "0" for the zeroth iteration, k is changed to "1" for the next iteration (or second pass through the loop). The process then loops back to step 203.

If the stopping condition at step 205 produces a YES result, then the iterative process is stopped and the third waveform for the kth iteration is a constant modulus waveform with exact nulls and the third waveform for the kth iteration is stored in computer memory 1302 by the computer processor 1306 at step 208. The computer processor 1306 causes an electromagnetic signal having the third waveform for the kth iteration to be transmitted out from the transmitter 1310 towards the target 1350 at step 209. At step 210, a return signal is received at the receiver 1312, reflected back from the target 1350, as a result of the transmitted signal along with noise and clutter. The return signal is provided to the computer processor 1306 which processes the return signal and stores data based on the return signal in the computer memory 1302 and displays data based on the return signal on computer display 1304. The data based on the return signal, received at step 210, may include characteristics of the return signal.

The following refers to a method of alternating projections in accordance with a prior art method. We denote the notch-forming step as projection operator $P_n$ and the set of signals with notches at the first plurality of frequency values as $S_n$. Similarly, enforcing the constant-modulus property is denoted as projection $P_c$, and the set of constant-modulus signals may be denoted as $S_c$. However, because $S_c$ is not a convex set, $P_c$ does not form a convex projection operator, and thus the classical theory of projection-onto-convex sets (PoCS) [D. C. Youla and H. Webb. Image restoration by the method of convex projections: Part I—theory. IEEE Trans. Medical Imaging, MI-1(2):81-94, October 1982] may not be applied directly. Nevertheless, enforcing the constant-modulus property with $P_c$ guarantees diminishing error between successive modified waveforms $y_k$ [A. Levi and H. Stark, Image restoration by the method of generalized projections with applications to restorations from magnitude. In Proc. IEEE Int. Conf. Acoust., Speech, Signal Processing (IS-CASSP), 1984].

Using these results, we can write the iterative method executed by the computer processor 1306 in FIG. 13 and as shown by flow chart 200 in FIG. 2 as $$y_{k+1} = P_c P_n y_k, k\ 0, 1, 2, \quad (2)$$

where $y_k$ is the input to the k th iteration of the iterative method shown by flow chart 200, and $y_0$ represents the first initialized waveform. Define $z_k$ as $$z_k = P_n y_k \quad (3)$$

Then $z_k$ has an exact notch, but not the constant-modulus property. By construction, $$y_k \in S_c, z_k \in S_n \text{ for all } k \geq 1.$$

Then $$\|y_{k+1} - z_{k+1}\| = \|y_{k+1} - P_n y_k\| \quad (4)$$

$$= \|P_c P_n y_k - P_n y_k\| \quad (5)$$

$$\leq \|y_k - P_n y_k\| \quad (6)$$

$$\leq \|y_k - z_k\| \quad (7)$$

Thus, the error does not increase with successive iterations of equation (1). Although this property does not guarantee the convergence of equation (1), it does ensure that the waveforms produced do not diverge. In practice, one or more embodiments of the present invention based on the above iterative method of alternating projections converges reliably.

Figure 3:
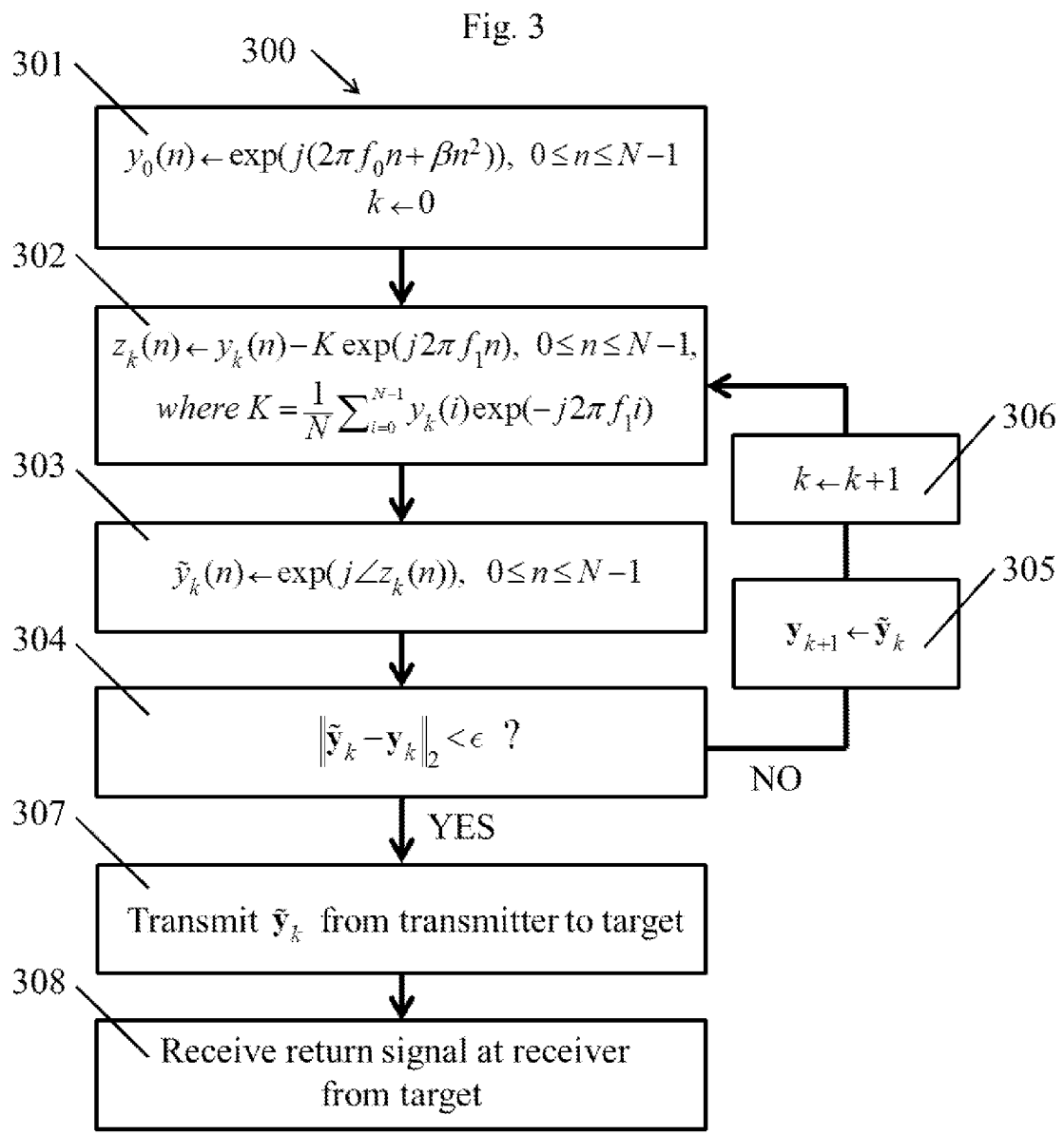
FIG. 3 shows an example of an embodiment of the present invention, for modifying an input electromagnetic signal having a chirp waveform to include a single frequency null at frequency $f_1$ and simultaneously exhibit a constant modulus.

FIG. 3 shows a flow chart 300, depicting a method of another embodiment of the present invention, creating a null at a specified frequency $f_1$ in an arbitrary initial waveform. The method shown by flow chart 300 may be implemented by the computer processor 1306 as programmed by a computer program stored in the computer memory 1302. At step 301, a first waveform for a zeroth iteration (for k=0, may be called a first iteration instead of a zeroth iteration for first pass through a loop), $y_0(n)$ is initialized by the computer processor 1306. The first waveform for the zeroth iteration (k=0) of step 301 may be a first chirp waveform having equation of:

$$\exp(j(2\pi f_0 t+\beta t^2)), 0\leq t\leq T; \text{ or } \exp(j(2\pi f_0 n+\beta n^2)),$$
$$0\leq n\leq N-1, \quad (8)$$

wherein t is a continous time index, wherein n is a discrete time index, and the equation in (7) with t is used for a continous time index case and the equation with n is used for a discrete time index case, wherein $f_0$ is a carrier frequency of the first chirp waveform, $\beta$ is a parameter describing a bandwidth of the first chirp waveform, and T is a duration of the first chirp waveform $y_0(n)$, (i.e. an example of the first waveform for the zeroth iteration of steps 201 or 301). The computer processor 1306 may store in computer memory 1302 the results of, the values of, the variables of, and any characteristics of equation (7) to initialize the first chirp waveform (an example of first waveform for the zeroth iteration). The variable k may be set to zero at step 301. At step 302, the first chirp waveform (an example of a first waveform for the zeroth iteration is modified by the computer processor 1306 to form a second waveform for the zeroth iteration $z_0(n)$, through the operation $$z_k(t) = y_k(t) K \exp(j2\pi f_1 t), 0\leq t\leq T; \text{ or } z_k(n) = y_k(n) K \exp(j2\pi f_1 n), 0\leq n\leq N-1, \quad (9)$$

wherein t is a continous time index, wherein n is a discrete time index, and the equation in (8) with t is used for a continous time index case and the equation with n is used for a discrete time index case.
Here $$K = \frac{1}{T} \int_0^T y_k(\tau) \exp(-j2\pi f_1 \tau) d\tau;$$

T is the duration of the first chirp waveform and f is a specified null frequency, creating a single null at frequency $f_1$. The computer processor 1306 may store in computer memory 1302 the results of, the values of, the variables of, and any characteristics of equation (8). In general, the computer processor 1306 may store in computer memory 1302 the results of, the values of, the variables of, and any characteristics of any of the equations provided in the present application.

At step 303, the computer processor 1306 forces the second waveform for zeroth iteration (k=0, or can be instead called first iteration for first pass through loop), $z_0(n)$ to be modified to form a third waveform for the zeroth iteration, $\tilde{y}_k$ having a constant modulus by the operation $\tilde{y}_k(t) \leftarrow \exp(j\angle z_k(t))$, $0\leq t\leq T$, wherein T is the duration of the first chirp waveform $y_0(n)$, $\angle(\cdot)$ denotes the angle operation $\arctan(\text{Im}(\cdot)/\text{Re}(\cdot))$. The computer processor 1306 may store in computer memory 1302 the results of, the values of, the variables of, and any characteristics of the equation executed at step 303.

At step 304, the total mean squared error between the third waveform for the zeroth iteration $\tilde{y}_k$ and the first waveform for the zeroth iteration $y_k$ is computed as $\|\tilde{y}_k - y_k\|$ by the computer processor 1306, and is compared with a threshold $\Delta$ stored in computer memory 1302. If the stopping condition is not met, the computer processor 1306 is programmed to execute step 305. At step 305, the first waveform for the next iteration (i.e. the k+1 th iteration), is set equation to the third waveform for the current iteration (i.e. the kth iteration). Thereafter K is incremented, i.e. set to k+1 at step 306 and the flow returns to step 302 for another iteration.

If the stopping condition at step 304 produces a YES result, then the iterative process is stopped and the third waveform for the kth iteration, $\tilde{y}_k$ is a constant modulus waveform with exact nulls and the third waveform for the kth iteration $\tilde{y}_k$ is stored in computer memory 1302 by the computer processor 1306 and the computer processor 1306 causes an electromagnetic signal having the third waveform for the kth iteration, $\tilde{y}_k$ to be transmitted out from the transmitter 1310 towards the target 1350 at step 307. At step 308, a return signal is received at the receiver 1312, reflected back from the target 1350, as a result of the transmitted signal along with noise and clutter. The return signal is provided to the computer processor 1306 which processes the return signal and stores data based on the return signal in the computer memory 1302 and displays data based on the return signal on computer display 1304. The data based on the return signal, received at step 308, may include characteristics of the return signal.

The third waveform for the kth iteration, $\tilde{y}_k$, of the electromagnetic signal transmitted out transmitter 1310 at step 307, has an approximately constant-modulus chirp-like waveform with a null at frequency $f_1$. The computer processor 1306 may store characteristics of the third waveform for the kth iteration $\tilde{y}_k$ and may supply those characteristics to the transmitter 1310 and may cause the transmitter 1310 to output an electromagnetic signal having the stored characteristics of the third waveform for the kth iteration $\tilde{y}_k$ to the airwaves 1314 towards the target 1350. The electromagnetic signal may be reflected and/or modified by the target 1350 and received back via the airwaves 1316 at an input of the receiver 1312.

Figure 4:
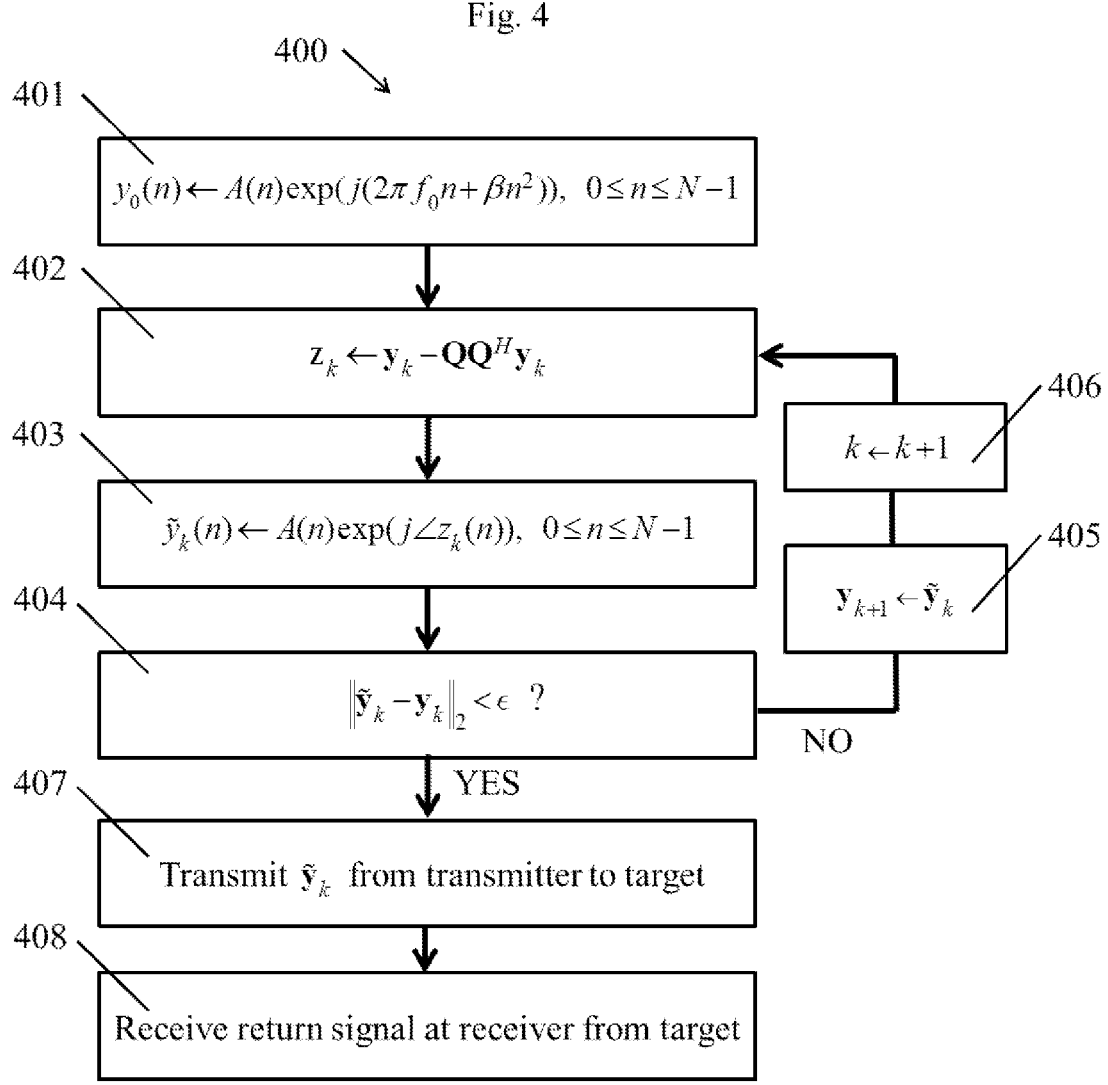
FIG. 4 shows another example of an embodiment of the present invention, for modifying an input electromagnetic signal having a chirp waveform to include multiple frequency nulls and simultaneously exhibit a pulse envelope shape of the initial input electromagnetic signal having the chirp waveform.

Instead of a chirp signal for the first waveform of the zeroth iteration, in at least one embodiment of the present invention, the first waveform for the zeroth iteration may be a waveform with any arbitrary envelope shape, such as A(n) as will be described with reference to a FIG. 4 embodiment. FIG. 4 shows a flow chart 400, depicting a method in accordance with another embodiment of the present invention. The embodiment shown by FIG. 4, creates a number of frequency nulls at specified frequencies $f_m$, m=1→M, where M is the number of nulls to be created, in an electromagnetic signal having an initial standard chirp waveform, while preserving the pulse envelope A(n) of the initial waveform. At step 401, a first chirp waveform, $y_0(n)$ (or first waveform for a kth iteration, with k=0) is initialized by the following equation:

$$y_0(n)=A(n)\exp(j(2\pi f_0 n+\beta n^2)), 0 \le n \le N-1 \quad (10)$$

wherein, where A(n) is a pulse envelope function, $f_0$ is a carrier frequency for the first waveform for the kth iteration, $\beta$ is a parameter describing the bandwidth of the waveform, and N is the number of samples in the waveform. The first chirp waveform or first waveform for the kth iteration, with k=0) may be initialized by the computer processor 1306 determining and storing characteristics, values, and/or variables of the equation (9) in the computer memory 1302. At step 402, the first waveform for the kth iteration, with k=0, is modified to form a second waveform for the kth iteration, with k=0, which has M nulls, each of a differing order $L_m$, m=1→M, at the frequencies $f_m$, m=1→M and characteristics, values, and/or variables of this second waveform for the kth iteration with k=0 may be determined by and stored in computer memory 1302 by the computer processor 1306. Creating these nulls is equivalent to satisfying the system of equations $$\frac{\partial^l}{\partial f} Y(f_m) - \left( \frac{\partial^l}{\partial f} \left[ \sum_{n=0}^{N-1} y(n)\exp(j2\pi f n) \right] \right)_{f=f_m}, 0 \quad (11)$$

$$0 \le l \le L_m,$$

$$1 \le m \le M,$$

where $$\frac{\partial^l(\cdot)}{\partial f}$$

denotes the lth derivative with respect to f, or $$C^H y = 0 \quad (12)$$

where C is an N×R matrix with $R=\Sigma_{m=0}^{M} L_m$, of the form $$C=[c_1, c_2, \ldots c_R], \quad (13)$$

where the column vectors are of the form $$c_m=[0, (-j2\pi)^{l-1}e^{-j2\pi f_m}, \ldots, (-j2\pi i)^{l-1}e^{-j2\pi i f_m}, \ldots, (-j2\pi(N-1))^{l-1}e^{-j2\pi(N-1)f_m}], \quad (14)$$

If all the specified nulls are first-order, this reduces to $$c_m=[1, e^{-j2\pi f_m}, e^{-j4\pi f_m}, \ldots, e^{-j2\pi i f_m}, \ldots, e^{-j2(N-1)\pi f_m}]^T. \quad (15)$$

Note $(\cdot)^H$ is the Hermitian conjugate operation, and 0 is the R-element zero vector. Given a waveform y, the waveform x closest to a solution y of equation (11) is given by x=Py, where P is the orthogonal projection operator given by $$P=I-(C^H C)^{-1} C^H \quad (16)$$

where I is the N×N identity matrix. To avoid numerical ill-conditioning resulting from the inverse operation in equation (15), the orthogonalization Q of C may be constructed by the computer processor 1306 using an orthogonalization step, which may be programmed in computer memory 1302 and implemented by the computer processor 1306 such as Gram-Schmidt orthogonalization [D. Bau III and L. N. Trefethen, Numerical Linear Algebra, pp. 50-59. Siam 1997], so that the columns of Q spans the same space as the columns of C, and $Q^H Q=I$. Then P may alternatively be constructed as $$P=I-QQ^H. \quad (17)$$

Thus the constraint $Q^H y=0$ is equivalent to the constraint in equation (11), and may be implemented as $$z_k \leftarrow y_k - QQ^H y_k \quad (18)$$

at step 402. The variables, values, matrices and/or characteristics of the equations (13) and (14) may be determined by the computer processor 1306 and stored in computer memory 1302.

At step 403 the second waveform for the kth iteration, $z_k$, is modified to form a third waveform for the kth iteration $\tilde{y}_k$, by the computer processor 1306 by forcing the third waveform for the kth iteration $\tilde{y}_k$ to have pulse envelope function A(n) by the operation $\tilde{y}_k(n) \leftarrow A(n)\exp(j<z_k(n))$, $0 \le N-1$, where $<(\cdot)$ denotes the angle operation arctan (Im( )/Re( ), and the variables, values and characteristics of the result are stored in computer memory 1302. At step 404, the computer processor 1306 determines the total mean squared error between the third waveform for the kth iteration $\tilde{y}_k$ and the first waveform for the kth iteration $y_k$, computed as $\|\tilde{y}_k - y_k\|_2$, and compares the total mean squared error with a threshold Δ stored in computer memory 1302. If the stopping condition is not met, at step 405, the first waveform for the (k+1)th iteration is set equal to the third waveform for the kth iteration, and then thereafter k is incremented at step 406 to k=k+1; and then flow returns to step 402.

If the stopping condition at step 404 produces a YES result, then the iterative process is stopped and the third waveform for the kth iteration, $\tilde{y}_k$ is a constant modulus waveform with exact nulls and the third waveform for the kth iteration $\tilde{y}_k$ is stored in computer memory 1302 by the computer processor 1306 at step 407. The third waveform for the kth iteration, $\tilde{y}_k$, is a chirp-like waveform with the pulse envelope A(n) of the initial waveform, and with nulls at frequencies $f_m$, m=1→M. The computer processor 1306 causes an electromagnetic signal having the third waveform for the kth iteration, $\tilde{y}_k$ to be transmitted out from the transmitter 1310 towards the target 1350 at step 407. At step 408, a return signal is received at the receiver 1312, reflected back from the target 1350, as a result of the transmitted signal along with noise and clutter. The return signal is provided to the computer processor 1306 which processes the return signal and stores data based on the return signal in the computer memory 1302 and displays data based on the return signal on computer display 1304. The data based on the return signal, received at step 408, may include characteristics of the return signal.

Figure 5:
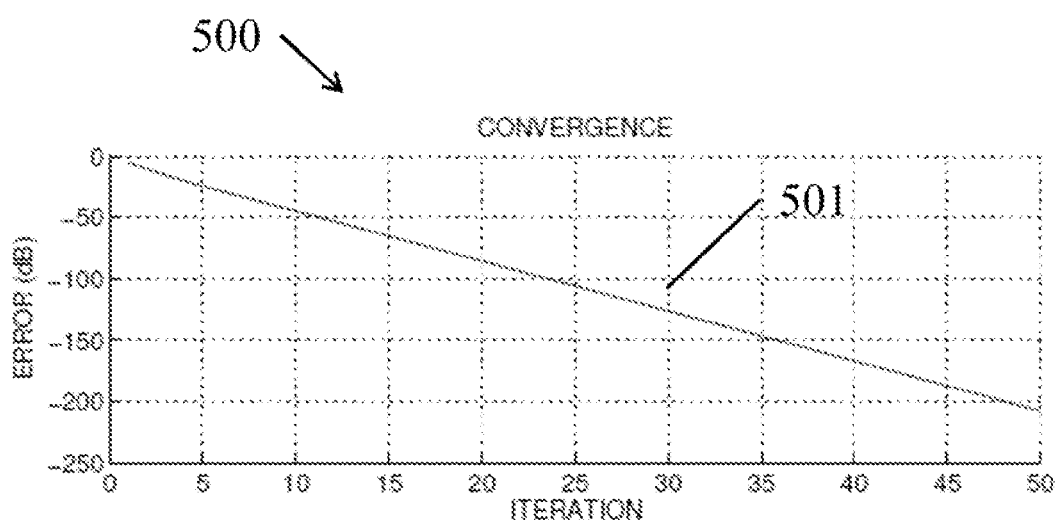
FIG. 5 shows a graph of error versus iteration number of an embodiment of the present invention.

FIG. 5 shows a diagram 500. The diagram 500 includes an x axis labeled "Iteration", and a y axis labeled "Error (dB) (decibels)". The diagram 500 includes a curve 501, representing the maximum value of the vector $C^H \tilde{y}$ as in equation (11), where $\tilde{y}$ is the third waveform for the kth iteration, when the stopping condition has been met, for the first fifty iterations of the method shown in FIG. 4 of one example trial of an embodiment of the present invention. The present invention in one or more embodiments demonstrates fast exponential-like convergence.

FIG. 6A shows a diagram 600. The diagram 600 includes an x axis labeled "Normalized Frequency (Hz)" (Hz—hertz), and a y axis labeled "(dB)". The diagram 600 includes a curve 601 representing the spectrum magnitude $|Y(f)|=|\Sigma_{n=0}^{N-1} y(n) \exp(-j2\pi f n)|$ of an example output electromagnetic signal $y(n)$ having the third waveform of the kth iteration, when the stopping condition has been met for FIG. 3 embodiment example, output from the transmitter 1310 to the airwaves 1314 towards the target 1350 in an embodiment of the present invention. The third waveform of the kth iteration, when the stopping condition of FIG. 3 met, $y(n)$ was created with the method of the embodiment represented by flow chart 300 in FIG. 3, with $y_0(n)$ equal to the chirp function in FIG. 1A and FIG. 1B, and $f_1=0$ Hz. The curve 601 includes region 601a, showing a deep notch at $f_1=0$ Hz.

FIG. 6B shows a diagram 610. The diagram 610 includes an x axis labeled "Time (samples)" and a y axis labeled "Normalized Frequency (Hz)". The diagram 610 includes a curve 611, representing the instantaneous frequency of an electromagnetic signal having the notched waveform in FIG. 6A, created by the computer processor 1306 in accordance with an embodiment of the present invention. The instantaneous frequency of the created electromagnetic signal having the notched waveform is approximately linear, resembling the instantaneous frequency of the initial waveform depicted in FIG. 1B, but with a small added oscillatory component.

FIG. 7A shows a diagram 700. The diagram 700 includes an x axis labeled "Time (samples)" and a y axis labeled "Autocorrelation Value". The diagram 700 includes a curve 701, representing the autocorrelation function $R_{yy}(s)=\Sigma_{n=0}^{N-1} y(n)y(n-s)$ for real-valued signals, for the standard chirp waveform depicted in FIG. 1A and FIG. 1B. The width of the main peak of the autocorrelation function, and the height of the side peaks, are important parameters for evaluating the resolution of radar systems utilizing chirp and chirp-like waveforms. FIG. 7B shows a diagram 710. The diagram 710 includes an x axis labeled "Time (samples)" and a y axis labeled "Autocorrelation Value". The diagram 710 includes a curve 711, representing the autocorrelation function $R_{yy}(s)=\Sigma_{n=0}^{N-1} y(n)y(n-s)$ for the notched chirp waveform created by the present invention, depicted in FIG. 6A and FIG. 6B. The curve 711 is similar to curve 701 in FIG. 7A, suggesting that the notched chirp waveform created by an embodiment of the present invention has similar resolution properties to the standard chirp waveform without the notched frequency property added by the present invention. FIG. 8A shows a diagram 800. The diagram 800 includes an x axis labeled "Normalized Frequency (Hz)" and a y axis labeled "(dB)". The diagram 800 includes a curve 801 representing the spectrum magnitude $|Y(f)|=|\Sigma_{n=0}^{N-1} y(n) \exp(-j2\pi f n)|$ of an example output electromagnetic signal $y(n)$ from the transmitter 1310 to the airwaves 1314 of an embodiment of the present invention. The waveform $y(n)$ is the third waveform for the kth iteration when the stopping condition is satisfied with the method of the embodiment represented by the flow chart 300 in FIG. 3, with $y_0(n)$ equal to the chirp function in FIG. 1A and FIG. 1B, and $f_1=0.1$ Hz. The curve 801 includes region 801a, showing a deep notch at $f_1=0.1$ Hz.

Figure 9A:
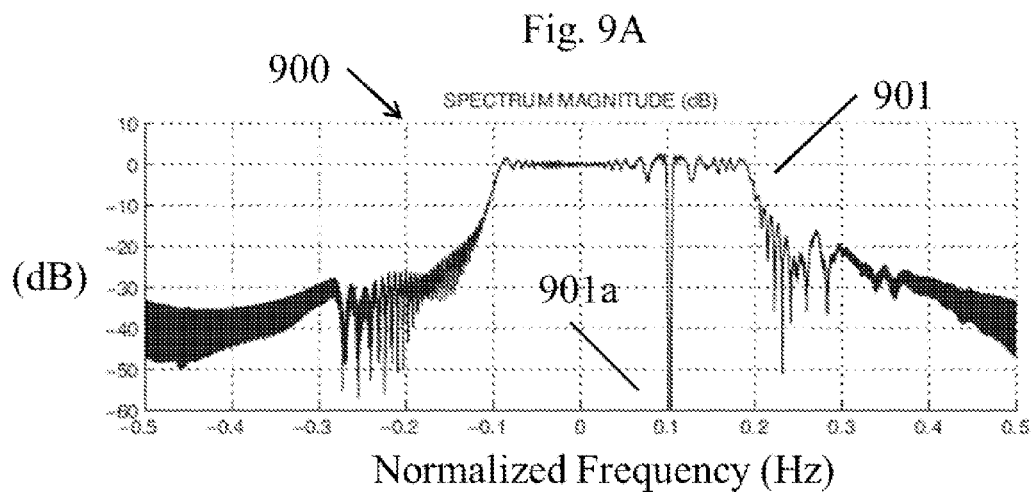
FIG. 9A shows a diagram of the spectrum magnitude of an electromagnetic signal having a waveform created by an embodiment of the present invention, modifying the electromagnetic signal having the waveform in FIG. 1A to include a $10^{th}$ order frequency null at frequency $f_1$=0.1025 Hz.

FIG. 8B shows a diagram 810. The diagram 810 includes an x axis labeled "Time (samples)" and a y axis labeled "Normalized Frequency (Hz)". The diagram 810 includes a curve 811, representing the instantaneous frequency of the notched waveform in FIG. 8A, created by an embodiment of the present invention. The instantaneous frequency of the created waveform is approximately linear, resembling the instantaneous frequency of the initial waveform depicted in FIG. 1B, but with a small added oscillatory component. FIG. 9A shows a diagram 900. The diagram 900 includes an x axis labeled "Normalized Frequency (Hz)" and a y axis labeled "(dB)". The diagram 900 includes a curve 901 representing the spectrum magnitude $|Y(f)|=|\Sigma_{n=0}^{N-1} y(n) \exp(-j2\pi f n)|$ of an example output electromagnetic signal $y(n)$ from the transmitter 1310 to the airwaves 1314 of an embodiment of the present invention. The waveform $y(n)$ is the third waveform for the kth iteration when the stopping condition of FIG. 4 is satisfied and was created with the embodiment represented by 400 in FIG. 4, with $y_0(n)$ equal to the chirp function in FIG. 1A and FIG. 1B, and a $10^{th}$ order null at $f_m=0.1025$ Hz, $1 \le m \le 10$. The curve 901 includes region 901a, showing a deep stop-band centered at frequency 0.1025 Hz.

Figure 9B:
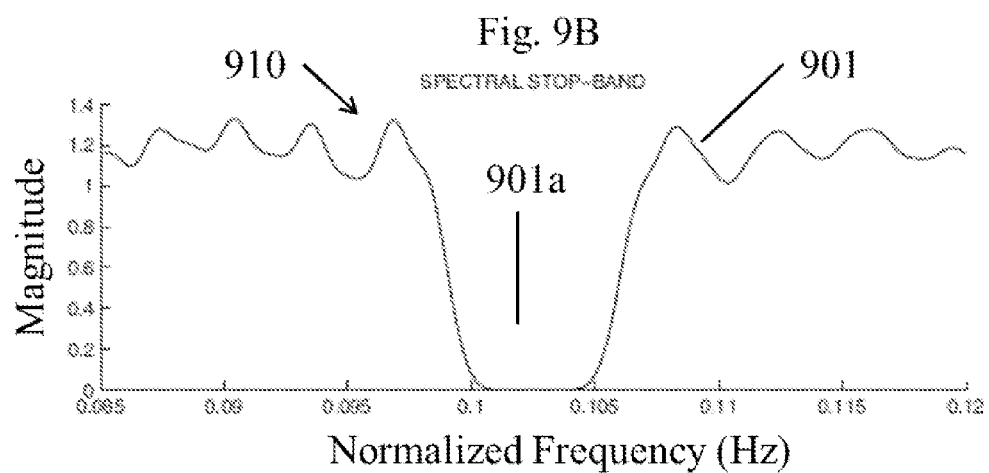
FIG. 9B shows a diagram of the stop-band 901a in FIG. 9A with a linear scale, for the frequencies 0.085 Hz to 0.12 Hz.

FIG. 9B shows a diagram 910. The diagram 910 includes an x axis labeled "Normalized Frequency (Hz)" and a y axis labeled "Magnitude". The diagram 910 includes curve 901 in FIG. 9A, plotted with a linearly-scaled y axis, from frequency 0.085 Hz to frequency 0.12 Hz. The curve 901 includes region 901a, showing the stop-band created by an embodiment of the present invention.

Figure 9C:
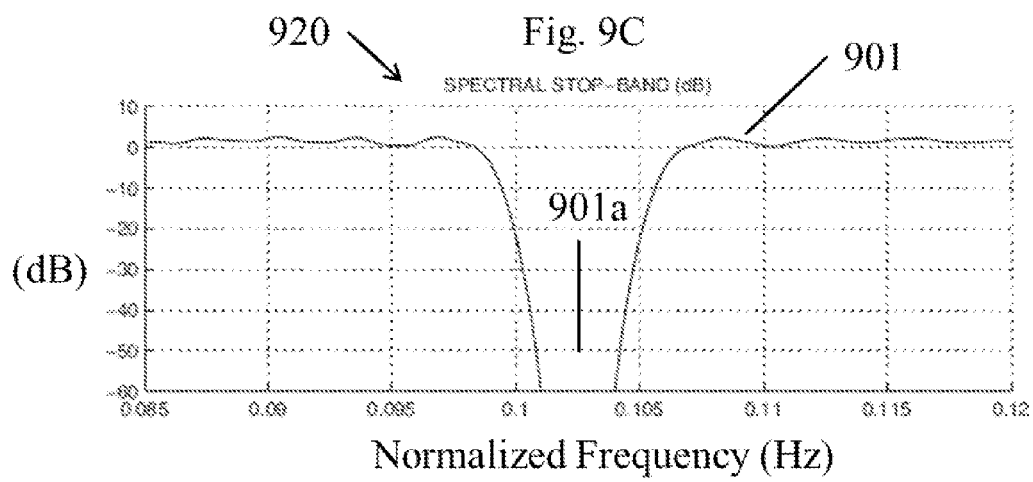
FIG. 9C shows a diagram of the stop-band 901a in FIG. 9A with a logarithmic scale, for the frequencies 0.085 Hz to 0.12 Hz.

FIG. 9C shows a diagram 920. The diagram 920 includes an x axis labeled "Normalized Frequency (Hz)" and a y axis labeled "(dB)". The diagram 920 includes curve 901 in FIG. 9A, plotted with a logarithmically-scaled y axis, from frequency 0.085 Hz to frequency 0.12 Hz. The curve 901 includes region 901a, showing the stop-band created by an embodiment of the present invention.

Figure 10A:
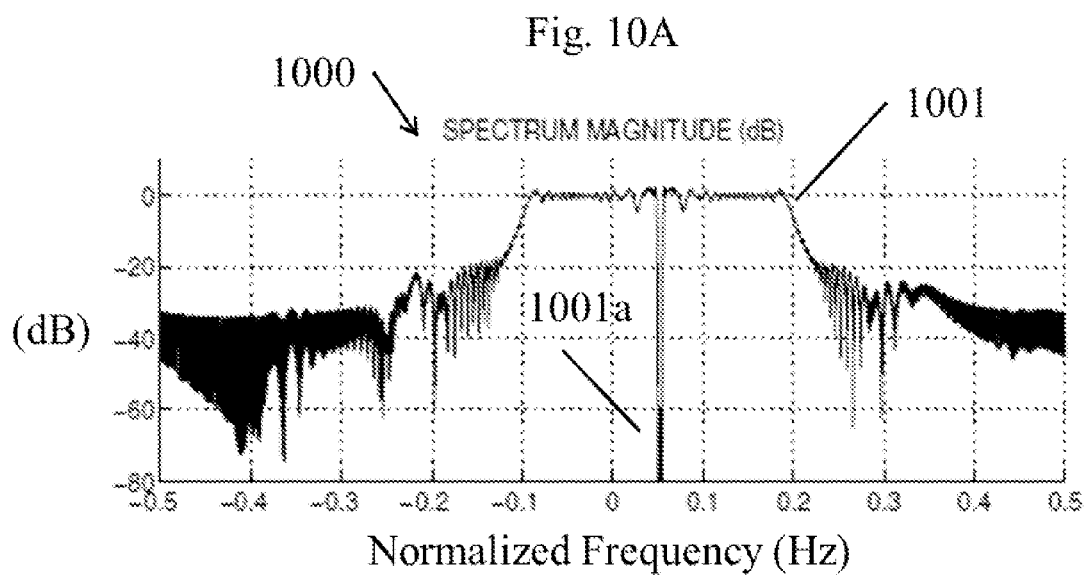
FIG. 10A shows a diagram of a spectrum magnitude of an electromagnetic signal having a waveform created by an embodiment of the present invention, modifying the electromagnetic signal having the waveform in FIG. 1A to include nine unevenly spaced nulls between frequency $f_1$=0.05 Hz and $f_9$=0.055 Hz.

FIG. 10A shows a diagram 1000. The diagram 1000 includes an x axis labeled "Normalized Frequency (Hz)" and a y axis labeled "(dB)". The diagram 1000 includes a curve 1001 representing the spectrum magnitude $|Y(f)|=|\Sigma_{n=0}^{N-1} y(n) \exp(-j2\pi f n)|$ of an example output electromagnetic signal $y(n)$ from the transmitter 1310 to the airwaves 1314 of an embodiment of the present invention. The waveform of FIG. 10A $y(n)$ is the third waveform for the kth iteration when the stopping condition of FIG. 4 is satisfied and was created with the embodiment represented by 400 in FIG. 4, with $y_0(n)$ equal to the chirp function in FIG. 1A and FIG. 1B, and $f_m=\{0.0500, 0.0504, 0.0510, 0.517, 0.0525, 0.0532, 0.0539, 0.0546, 0.055\}$ Hz. The curve 1001 includes region 1001a, showing a deep stop-band from frequency 0.05 Hz to frequency 0.055 Hz. The stop-band 1001a exhibits approximate equiripple behavior due to the chosen uneven spacing of the frequency nulls.

Figure 10B:
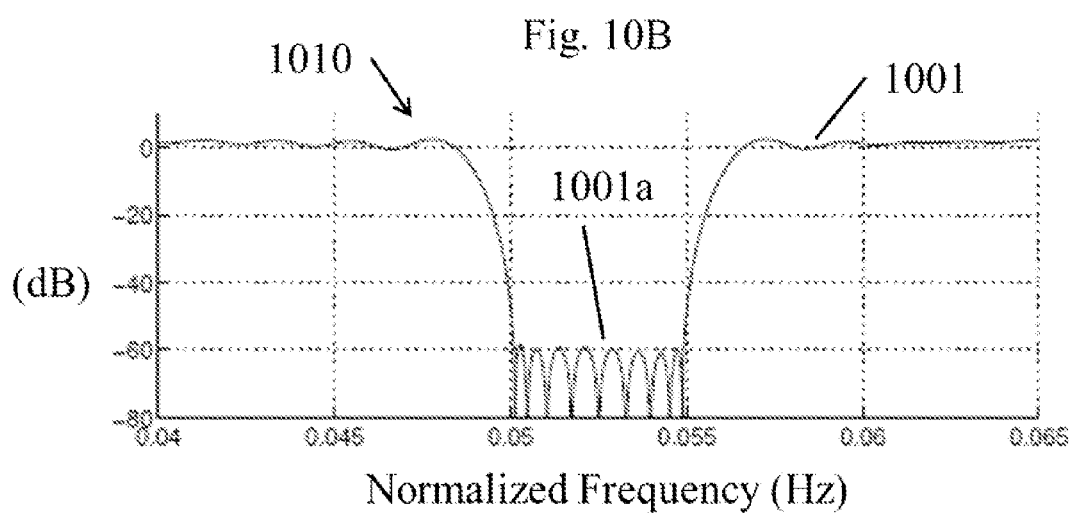
FIG. 10B shows a diagram of the stop-band 1001a in FIG. 10A from the frequency 0.04 Hz to frequency 0.065 Hz.

FIG. 10B shows a diagram 1010. The diagram 1010 includes an axis labeled "Normalized Frequency (Hz)" and a y axis labeled "(dB)". The diagram 1010 includes curve 1001 in FIG. 9A, from frequency −0.04 Hz to frequency 0.065 Hz. The curve 1001 includes region 1001a, showing the stop-band created by the present invention.

Figure 11:
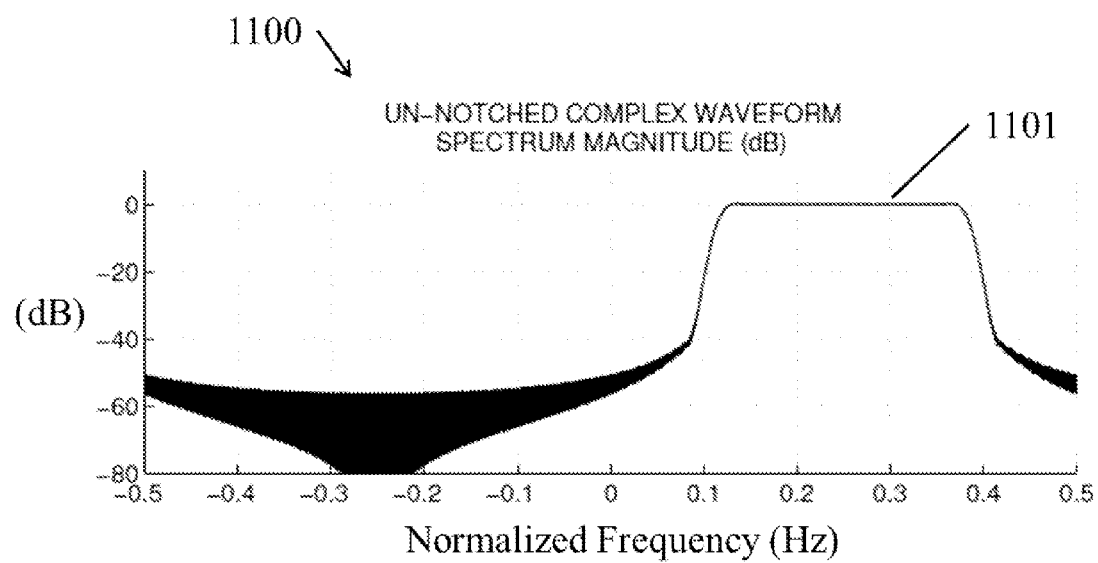
FIG. 11 shows a diagram of the spectrum magnitude of a standard chirp waveform with frequency swept over the interval 0.1 Hz to 0.4 Hz.

FIG. 11 shows a diagram 1100. The diagram 1100 includes an x axis labeled "Normalized Frequency (Hz)" and a y axis labeled "(dB)". The diagram 1100 includes a curve 1101, representing the spectrum magnitude $|Y(f)|=|\Sigma_{n=0}^{N-1}y(n)\exp(-j2\pi fn)|$ of a standard chirp waveform y(n), with frequency swept from 0.1 Hz to 0.4 Hz.

Figure 12A:
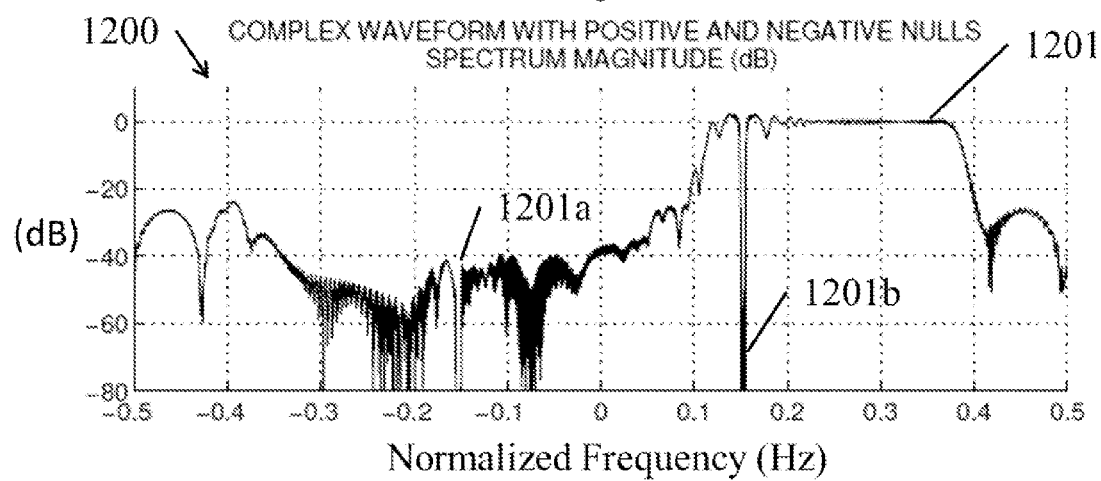
FIG. 12A shows a diagram of the spectrum magnitude of a waveform created by an embodiment of the present invention, modifying the waveform in FIG. 11 to include 18 nulls at the frequencies $f_m$=±{0.1500, 0.1506, 0.01513, 0.1519, 0.1525, 0.1531, 0.1538, 0.1544, 0.1550}.

FIG. 12A shows a diagram 1200. The diagram 1200 includes an x axis labeled "Normalized Frequency (Hz)" and a y axis labeled "(dB)". The diagram 1200 includes a curve 1201, representing the spectrum magnitude $|Y(f)|=|\Sigma_{n=0}^{N-1}y(n)\exp(-j2\pi fn)|$ of an example output y(n) of the present invention. The waveform y(n) shown in FIG. 12A, is the third waveform for the kth iteration when the stopping condition is satisfied in FIG. 4, and was created with the embodiment represented by 400 in FIG. 4, with $y_0(n)$ equal to the standard chirp waveform depicted in FIG. 10, and notched frequencies $f_m$={0.1500, 0.1506, 0.01513, 0.1519, 0.1525, 0.1531, 0.1538, 0.1544, 0.1550}. The curve 1101 includes region 1101a, showing a notched band in the negative frequency range created by the present invention, and region 1101b, showing a notched band in the positive frequency range created by the present invention.

Figure 12B:
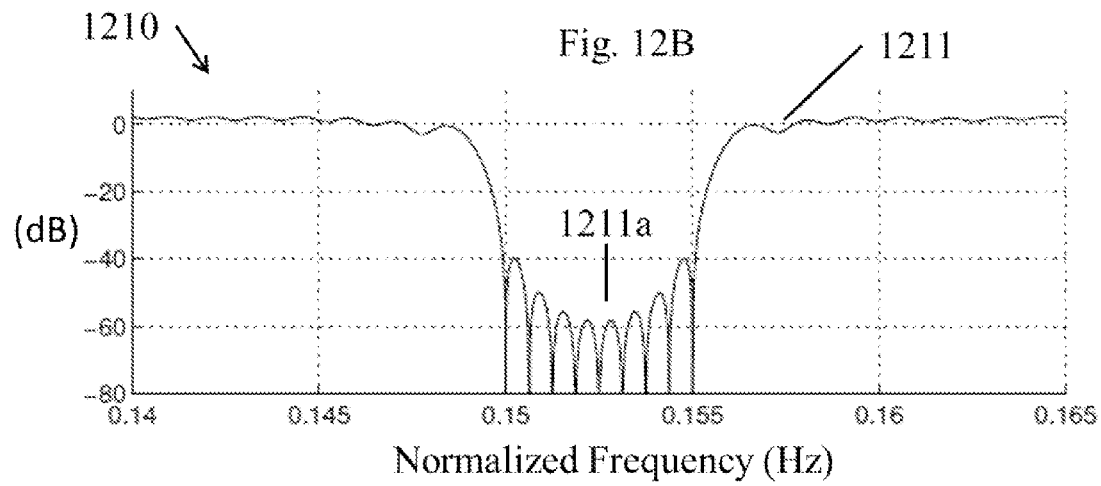
FIG. 12B shows a diagram of the real value of the spectrum in FIG. 12A at the stop-band 1201b from the frequency 0.14 Hz to frequency 0.165 Hz.

FIG. 12B shows a diagram 1210. The diagram 1210 includes an x axis labeled "Normalized Frequency (Hz)" and a y axis labeled "(dB)". The diagram 1210 includes curve 1211, representing the real value of the waveform spectrum over the frequency range 0.14 Hz to 0.165 Hz. The curve 1211 includes region 1211a, showing the real value of the stopband whose magnitude is shown by 1201b in FIG. 11A. Region 1211a shows the deep notches created by the present invention are maintained when the real part of the waveform is taken—this is due to the chosen frequency notches having symmetry about the frequency 0 Hz. This demonstrates that real-valued waveforms with deep notches and deep stopbands may be created using an embodiment of the present invention.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

We claim:

1. A method for creating a radar transmit waveform comprising:
   storing in a computer memory a first waveform for a zeroth iteration;
   receiving in a computer memory a plurality of frequency values;
   receiving in a computer memory a plurality of notch depths, such that each of the plurality of frequency values has a corresponding notch depth of the plurality of notch depths;
   receiving in a computer memory a pulse envelope function;
   repeating the following steps for one or more iterations, starting with the zeroth iteration, such that k=0 for the zeroth iteration:
   modifying the first waveform for the kth iteration to create a second waveform for the kth iteration in computer memory, such that a Fourier transform of the second waveform for the kth iteration is equal to zero at each of the plurality of frequency values;
   modifying the second waveform for the kth iteration to form a third waveform for the kth iteration in computer memory, such that the pulse envelope function of the third waveform for the kth iteration is equal to the pulse envelope function of the first waveform for the kth iteration;
   if a stopping condition has not been met, storing the third waveform for the kth iteration as a first waveform for the (k+1)th iteration in computer memory, thereafter with k incremented by one, starting a kth iteration of the one or more iterations, and otherwise if the stopping condition has been met, stopping the one or more iterations, wherein the stopping condition is defined by a set of criteria stored in computer memory.

2. The method of claim 1 further comprising:
   if the stopping condition has been met, transmitting an electromagnetic signal having the third waveform for the kth iteration out from a transmitter towards a target, and receiving a return electromagnetic signal from the target.

3. The method of claim 1 wherein
   the first waveform for the zeroth iteration is a swept-frequency chirp waveform of a specific bandwidth and duration.

4. The method of claim 1 wherein
   the pulse envelope function is a constant modulus function.

5. The method of claim 1 wherein
   after the stopping condition has been met, the third waveform for the kth iteration has a plurality of stop bands;
   wherein each of the plurality of stop bands of the third waveform for the kth iteration has a spectrum magnitude which is approximately zero.

6. The method of claim 1 wherein
   after the stopping condition has been met, the third waveform for the kth iteration includes a first notch at a first frequency value;
   wherein the first notch has a Fourier transform value at the first frequency value which is approximately zero and
   wherein the first notch is based on an order derivative of a Fourier transform, wherein the order derivative of the Fourier transform is greater than or equal to a first order derivative.

7. The method of claim 1 wherein
   the first waveform of the zeroth iteration, called $y_0$, is a chirp waveform and is determined by a computer processor from the following equation:

$$y_0=\exp(j(2\pi f_0 t+\beta t^2)), 0\le t\le T$$

wherein $f_0$ is a carrier frequency of the first waveform, $\beta$ is a parameter describing a bandwidth of the first waveform of the zeroth iteration, and T is a duration of the first waveform of the zeroth iteration $y_0(n)$.

8. The method of claim 1 wherein
   the first waveform for the kth iteration, which is called $y_k(t)$, is modified to form the second waveform for the kth iteration, which is called $z_k(t)$ by a computer processor using the following equation:

$$z_k(t)=y_k(t)K\exp(j2\pi f_1 t), 0\le t\le T;$$

Wherein t is a continous time index; wherein $$K=\frac{1}{T}\int_0^T y_k(\tau)\exp(-j2\pi f_1\tau)d\tau;$$

T is a duration of the first waveform for the kth iteration, $y_k(t)$; and $f_1$ is a specified null frequency, creating a single null at frequency $f_1$.

9. The method of claim 1 wherein
the first waveform for the kth iteration, which is called $y_k(n)$, is modified to form the second waveform for the kth iteration, which is called $z_k(n)$ by a computer processor using the following equation:

$$z_k(n)=y_k(n)-K\exp(j2\pi f_1 n), 0 \leq n \leq N-1$$

Wherein n is a discrete time index; wherein $$K = \frac{1}{N}\sum_{n=0}^{N-1} y_k(n)\exp(-j2\pi f_1 n);$$

N is a number of points of the first waveform for the kth iteration, $y_k(n)$; and $f_1$ is a specified null frequency, creating a single null at frequency $f_1$.

10. The method of claim 1 wherein
the second waveform for the kth iteration, named $z_k(t)$ is modified to form the third waveform for the kth iteration, named $\tilde{y}_k(t)$ by the following equation:

$$\tilde{y}_k(t) \leftarrow \exp(j<z_k(t)), 0 \leq t \leq T,$$

wherein T is the duration of the first waveform for the zeroth iteration $y_0(t)$, $<(\bullet)$ denotes the angle operation $\arctan(\text{Im}(\bullet)/\text{Re}(\bullet))$.

11. The method of claim 1 wherein
the stopping condition is that a total mean squared error between the third waveform for the kth iteration $\tilde{y}_k(t)$ and the first waveform for the kth iteration $y_k(t)$ which is computed as $\|\tilde{y}_k(t)-y_k(t)\|$ by a computer processor, is less than a threshold stored in computer memory.

12. The method of claim 1 wherein
the first waveform of the zeroth iteration is chirp waveform specified as $y_0(n)$ and is determined by a computer processor using the following equation:

$$y_0(n)=A(n)\exp(j(2\pi f_0 n+\beta^2)), 0 \leq n \leq N-1 \qquad (19)$$

wherein, $A(n)$ is a pulse envelope function, $f_0$ is a carrier frequency for the first waveform for the kth iteration, $\beta$ is a parameter describing the bandwidth of the waveform, and N is a number of samples in the first waveform of the zeroth iteration.

13. The method of claim 1 wherein
the first waveform for the kth iteration, which is called $y_k$ is modified to form the second waveform for the kth iteration, which is called zk, by using a computer processor to determine the following equation:

$$z_k \leftarrow y_k - QQ^H y_k$$

wherein Q is a matrix which is an orthogonalization of a matrix C whose columns consist of a plurality of vectors each of which is either a discrete Fourier transform vector or a derivative vector of a order derivative greater than or equal to a first order derivative, associated with the plurality of frequency values, given by $$C=[c_1, c_2, \ldots, c_R],$$

wherein $c_1, c_2, \ldots, c_R$ specify a plurality of column vectors, such that the matrix C has r column vectors, and each column vector of the plurality of column vectors has the form $$c_m=[0,(-j2\pi)^{l-1}e^{-j2\pi i f_m}, \ldots, (-j2\pi i)^{l-1}e^{-j2\pi i f_m}, \ldots, (-j2\pi(N-1))^{l-1}e^{-j2\pi(N-1)f_m}]$$

wherein m is an index indicating a particular column vector of the matrix C; and wherein l is a an integer used to indicate a derivative of an order greater than or equal to a first order derivative, such that l is greater or equal to one
and $Q^H$ is a matrix which is the Hermitian conjugate of Q.

14. The method of claim 1 wherein
the second waveform for the kth iteration, named $z_k(n)$ is modified to form the third waveform for the kth iteration, named $\tilde{y}_k(n)$, by using a computer processor to force the third waveform for the kth iteration to have pulse envelope function $A(n)$ by the operation $\tilde{y}_k(n) \leftarrow A(n)\exp(j<z_k(n)), 0 \leq n \leq N-1$, where $<(\bullet)$ denotes the angle operation $\arctan(\text{Im}(\bullet)/\text{Re}(\bullet))$.

15. The method of claim 1 wherein
the stopping condition is that a total mean squared error between the third waveform for the kth iteration $\tilde{y}_k(n)$, and the first waveform for the kth iteration $y_k(n)$, computed by a computer processor as $\|\tilde{y}_k(n)-y_k(n)\|_2$, is less than a threshold stored in computer memory.

16. An apparatus for creating a radar transmit waveform comprising:
a computer processor; and
a computer memory;
wherein the computer processor is configured to communicate with the computer memory;
wherein the computer processor is programmed by a computer program to:
store in the computer memory a first waveform for a zeroth iteration;
store in the computer memory a plurality of frequency values;
store in the computer memory a plurality of notch depths, such that each of the plurality of frequency values has a corresponding notch depth of the plurality of notch depths; and
store in the computer memory a pulse envelope function;
and wherein the computer processor is programmed by a computer program to repeat the following steps for one or more iterations, starting with the zeroth iteration, such that k=0 for the zeroth iteration:
(a) modify the first waveform for the kth iteration to create a second waveform for the kth iteration in the computer memory, such that a Fourier transform of the second waveform for the kth iteration is equal to zero at each of the plurality of frequency values;
(b) modify the second waveform for the kth iteration to form a third waveform for the kth iteration in the computer memory, such that the pulse envelope function of the third waveform for the kth iteration is equal to the pulse envelope function of the first waveform for the kth iteration; and
(c) if a stopping condition has not been met, store the third waveform for the kth iteration as a first waveform for the (k+1) th iteration in the computer memory, thereafter with k incremented by one, starting a kth iteration of the one or more iterations, and otherwise if the stopping condition has been met, stopping the one or more iterations, wherein the stopping condition is defined by a set of criteria stored in the computer memory.

17. The apparatus of claim 16 wherein
the first waveform for the zeroth iteration is a swept-frequency chirp waveform of a specific bandwidth and duration.

18. The apparatus of claim 16 wherein
the pulse envelope function is a constant modulus function.

19. The apparatus of claim 16 wherein
after the stopping condition has been met, the third waveform for the kth iteration has a plurality of stop bands;

wherein each of the plurality of stop bands of the third waveform for the kth iteration has a spectrum magnitude which is approximately zero.

20. The apparatus of claim 16 wherein
after the stopping condition has been met, the third waveform for the kth iteration includes a first notch at a first frequency value;
wherein the first notch has a Fourier transform value at the first frequency value which is approximately zero and
wherein the first notch is based on an order derivative of a Fourier transform, wherein the order derivative of the Fourier transform is greater than or equal to a first order derivative.

21. The apparatus of claim 16 wherein
the first waveform of the zeroth iteration, called $y_0$, is a chirp waveform and is determined by the computer processor from the following equation:

$$y_0 = \exp(j(2\pi f_0 t + \beta t^2)), 0 \le t \le T$$

wherein $f_0$ is a carrier frequency of the first waveform, $\beta$ is a parameter describing a bandwidth of the first waveform of the zeroth iteration, and T is a duration of the first waveform of the zeroth iteration $y_0(n)$.

22. The apparatus of claim 16 wherein
the first waveform for the kth iteration, which is called $y_k(t)$, is modified to form the second waveform for the kth iteration, which is called $z_k(t)$ by the computer processor using the following equation:

$$z_k(t) = y_k(t) K \exp(j 2\pi f_1 t), 0 \le t \le T;$$

Wherein t is a continous time index; wherein $$K = \frac{1}{T} \int_0^T y_k(\tau) \exp(-j 2\pi f_1 \tau) d\tau;$$

T is a duration of the first waveform for the kth iteration, $y_k(t)$; and $f_1$ is a specified null frequency, creating a single null at frequency $f_1$.

23. The apparatus of claim 16 wherein
the first waveform for the kth iteration, which is called $y_k(n)$, is modified to form the second waveform for the kth iteration, which is called $z_k(n)$ by the computer processor using the following equation:

$$z_k(n) = y_k(n) - K \exp(j 2\pi f_1 n), 0 \le n \le N-1$$

Wherein n is a discrete time index; wherein $$K = \frac{1}{N} \sum_{n=0}^{N-1} y_k(n) \exp(-j 2\pi f_1 n);$$

N is a number of points of the first waveform for the kth iteration, $y_k(n)$; and $f_1$ is a specified null frequency, creating a single null at frequency $f_1$.

24. The apparatus of claim 16 wherein
the second waveform for the kth iteration, named $z_k(t)$ is modified to form the third waveform for the kth iteration, named $\tilde{y}_k(t)$ by the following equation:

$$\tilde{y}_k(t) \leftarrow \exp(j \angle z_k(t)), 0 \le t \le T;$$

wherein T is the duration of the first waveform for the zeroth iteration $y_0(t)$, $\angle(\bullet)$ denotes the angle operation arctan $(Im(\bullet)/Re(\bullet))$.

25. The apparatus of claim 16 wherein
the stopping condition is that a total mean squared error between the third waveform for the kth iteration $\tilde{y}_k(t)$ and the first waveform for the kth iteration $y_k(t)$ which is computed as $\|\tilde{y}_k(t) - y_k(t)\|$ by the computer processor, is less than a threshold stored in the computer memory.

26. The apparatus of claim 16 wherein
the first waveform of the zeroth iteration is chirp waveform specified as $y_0(n)$ and is determined by a computer processor using the following equation:

$$y_0(n) = A(n) \exp(j(2\pi f_0 n + \beta n^2)), 0 \le n \le N-1 \quad (20)$$

wherein, $A(n)$ is a pulse envelope function, $f_0$ is a carrier frequency for the first waveform for the kth iteration, $\beta$ is a parameter describing the bandwidth of the waveform, and N is a number of samples in the first waveform of the zeroth iteration.

27. The apparatus of claim 16 wherein
the first waveform for the kth iteration, which is called $y_k$ is modified to form the second waveform for the kth iteration, which is called $z_k$, by using the computer processor to determine the following equation:

$$z_k \leftarrow y_k - QQ^H y_k$$

wherein Q is a matrix which is an orthogonalization of a matrix C whose columns consist of a plurality of vectors each of which is either a discrete Fourier transform vector or a derivative vector of a order derivative greater than or equal to a first order derivative, associated with the plurality of frequency values, given by $$C = [c_1, c_2, \ldots, c_R],$$

wherein $c_1, c_2, \ldots, c_R$ specify a plurality of column vectors, such that the matrix C has r column vectors, and each column vector of the plurality of column vectors has the form $$c_m = [0, (-j2\pi)^{l-1} e^{-j2\pi f_m}, \ldots, (-j2\pi i)^{l-1} e^{-j2\pi i f_m}, \ldots, (-j2\pi (N-1))^{l-1} e^{-j2\pi (N-1) f_m}]$$

wherein m is an index indicating a particular column vector of the matrix C; and wherein l is a an integer used to indicate a derivative of an order greater than or equal to a first order derivative, such that l is greater or equal to one
and $Q^H$ is a matrix which is the Hermitian conjugate of Q.

28. The apparatus of claim 16 wherein
the second waveform for the kth iteration, named $z_k(n)$ is modified to form the third waveform for the kth iteration, named $\tilde{y}_k(n)$, by using the computer processor to force the third waveform for the kth iteration to have pulse envelope function $A(n)$ by the operation $\tilde{y}_k(n) \leftarrow A(n) \exp(j \angle z_k(n))$, $0 \le n \le N-1$, where $\angle(\bullet)$ denotes the angle operation arctan $(Im(\bullet)/Re(\bullet))$.

29. The apparatus of claim 16 wherein
the stopping condition is that a total mean squared error between the third waveform for the kth iteration $\tilde{y}_k(n)$, and the first waveform for the kth iteration $y_k(n)$, computed by a computer processor as $\|\tilde{y}_k(n) - y_k(n)\|_2$, is less than a threshold stored in computer memory.

30. The apparatus of claim 16 further comprising
a transmitter, and a receiver which are configured to communicate with the computer processor;
and wherein the computer processor is programmed by a computer program to cause an electromagnetic signal having the third waveform for the kth iteration to be transmitted out from the transmitter towards a target, and the computer processor is configured to process a return electromagnetic signal from the target received at the receiver.

* * * * *